(87.)
WILLIAM EBBITT.
Improvement in Friction Pulley.
No. 122,818.          Patented Jan. 16, 1872.
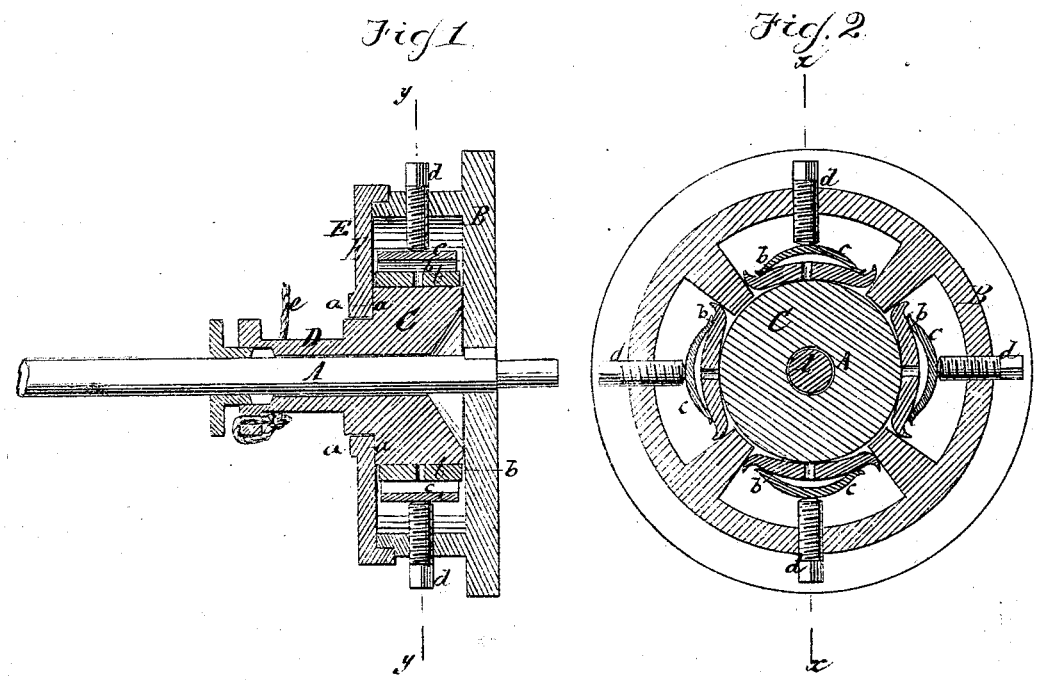
Witnesses.
Ernst Bilhuber
E. F. Kastenhuber
Inventor.
William Ebbitt

UNITED STATES PATENT OFFICE.

WILLIAM EBBITT, OF NEW YORK, N. Y.

IMPROVEMENT IN FRICTION-PULLEYS.

Specification forming part of Letters Patent No. 122,818, dated January 16, 1872.

*To all whom it may concern:*

Be it known that I, WILLIAM EBBITT, of the city, county, and State of New York, have invented a new and Improved Friction-Pulley; and I do hereby declare the following to be a full, clear, and exact description thereof, which will enable those skilled in the art to make and use the same, reference being had to the accompanying drawing forming part of this specification, in which drawing—

Figure 1 represents a longitudinal central section of my invention in the plane $x \, x$, Fig. 2. Fig. 2 is a transverse section of the same in the plane $y \, y$, Fig. 2.

Similar letters indicate corresponding parts.

This invention consists in the arrangement of a closed cage, which is mounted firmly on a shaft, and which embraces the hub of a pulley or drum, that turns loosely on said shaft, and the working part of which projects through one side of the cage, said cage being divided in four (more or less) compartments, each of which contains a shoe and a spring, which is depressed against the shoe by means of a set-screw, tapped into the rim of the cage in such a manner that by adjusting these set-screws the pressure of the shoes against the circumference of the hub can be regulated without removing any portion of the cage, and, at the same time, the cage being perfectly closed, is capable of retaining a large quantity of oil for the lubrication of the friction surfaces, and by these means a friction-pulley is obtained the power of which can be regulated with convenience, and which can be run for a long time without requiring any attention.

In the drawing, the letter A designates a shaft on which is firmly mounted a cage, B, which incloses the hub C of a drum, D, the head E of the cage being connected to the body thereof by screws or other suitable means so that it can be removed for the admission of the hub C, said hub being provided with a shoulder, $a$, which forms a bearing-surface to enable the head E to confine the hub within the cage, as shown in Fig. 1 of the drawing.

In practice a suitable packing will be interposed between the head and the body of the drum so as to produce a tight joint, and the shoulder $a$ will be faced off to bear nicely against the inner surface of the head, and to prevent any leakage of oil which is poured into the cage for the lubrication of the friction surfaces.

The cage B is divided in four (more or less) compartments, each of which contains a shoe, $b$, and a spring, $c$, and in the rim of the cage are placed set-screws $d$, which bear on the springs $c$. By the action of the set-screws and springs the shoes $b$ are depressed upon the circumference of the hub C, and it requires a certain amount of power to turn the drum D independent of the shaft A. By adjusting the set-screws $d$ this power can be increased or diminished; and since these set-screws can be reached at all times without removing any portion of the cage or of the drum, I am enabled to regulate the power required to turn the drum independent of the shaft with the greatest ease and accuracy.

If the drum D is used, for instance, to wind up a rope, $e$, the power for turning said drum being applied to the cage B, said rope will be wound up until its strain exceeds the power required to turn the drum independent of the shaft, and as soon as this point is reached the cage and the shaft can be revolved continuously without imparting any further motion to the drum, or without further increasing the strain on the rope; and, since the cage B is closed tight, a large quantity of oil can be poured into it, and my friction-pulley can be run for a long time without requiring any attention, the cage protecting the friction surfaces against dirt or impurities. The shoes $b$ may be provided with one or more holes to allow the oil to pass freely to the friction surfaces.

One of the principal advantages of my friction-pulley, however, is based on the facility with which the amount of friction between the drum and the cage can be regulated by means of the set-screws $d$.

What I claim as new, and desire to secure by Letters Patent, is—

The cage B, provided with set-screws $d$ in its rim, and containing shoes $b$ and springs $c$, said cage being mounted firmly on a shaft, A, and being made to inclose the hub of a drum, D, which is mounted loosely on said shaft, substantially in the manner herein shown and described.

WM. EBBITT.

Witnesses:
W. HAUFF,
E. F. KASTENHUBER. (87)